J. B. WARING.
ROCK-DRILLING MACHINE.
No. 178,214. Patented May 30, 1876.
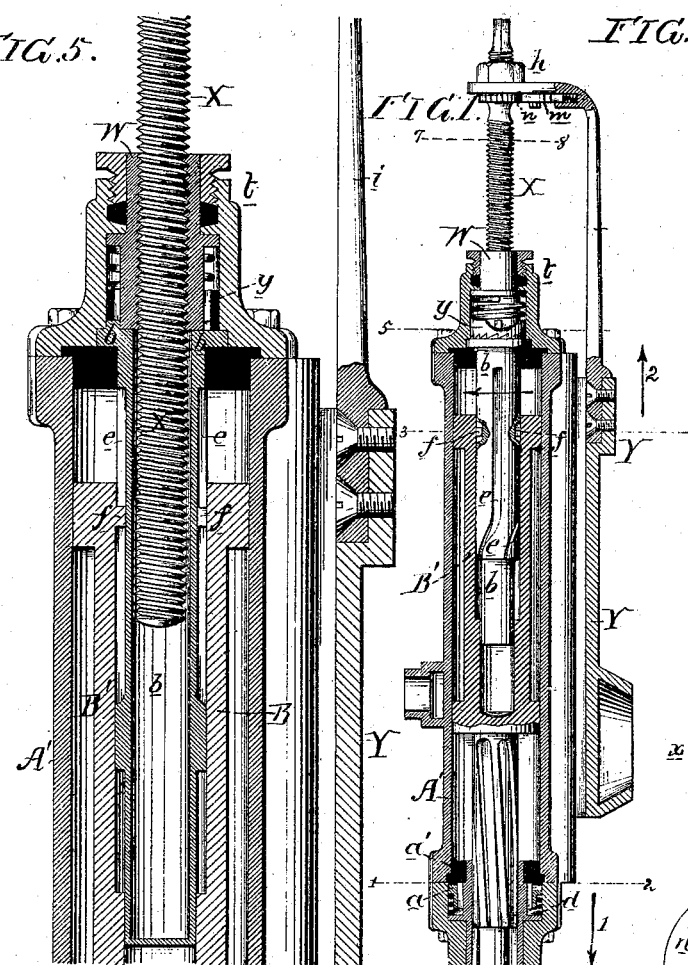
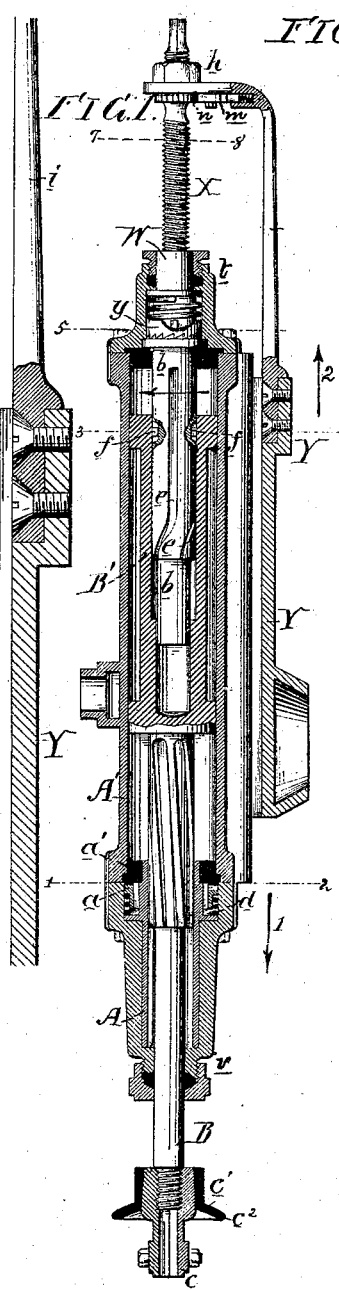
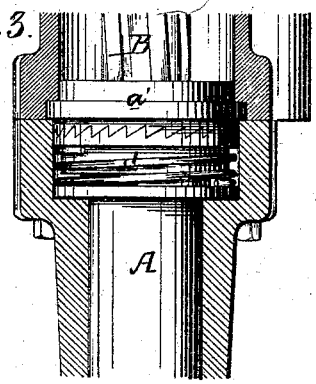
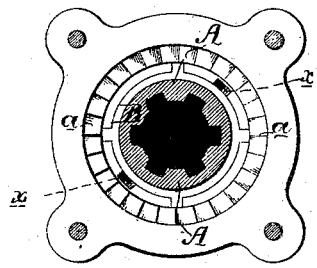
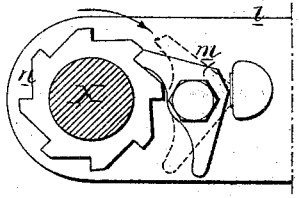
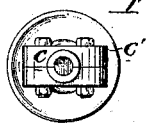
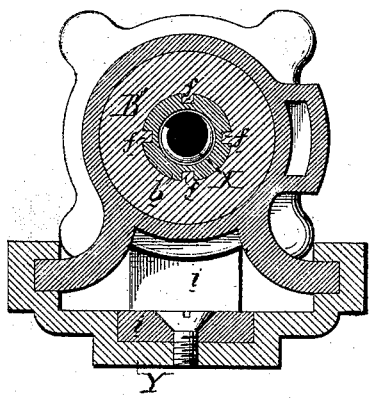
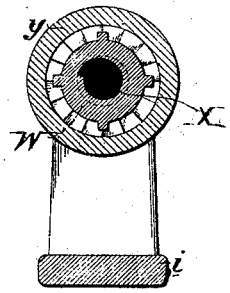
Witnesses, Hubert Howson
Thomas McIlvain
John B. Waring
By his attys,
Howson and Son.

UNITED STATES PATENT OFFICE.

JOHN B. WARING, OF NEW YORK, N. Y., ASSIGNOR TO THE WARING ROCK DRILL COMPANY, OF SAME PLACE.

IMPROVEMENT IN ROCK-DRILLING MACHINES.

Specification forming part of Letters Patent No. 178,214, dated May 30, 1876; application filed July 21, 1874.

*To all whom it may concern:*

Be it known that I, JOHN B. WARING, of the city, county, and State of New York, have invented certain Improvements in Rock-Drilling Machines, of which the following is a specification:

My invention relates to rock-drilling machines in which the drill-rod is connected directly to a piston-rod caused to reciprocate in a cylinder by steam or compressed air; and the main object of my invention is to rotate the said drill-rod and feed the same by simple and efficient mechanism, which I will now proceed to describe, reference being had to the accompanying drawing, in which—

Figure 1 is a longitudinal section, illustrating my improvement in rock-drilling mechanism; Fig. 2, an end view of the drill-rod holder or chuck; Fig. 3, an enlarged sectional view of the front part of the mechanism; Fig. 4, a transverse section on the line 1 2, looking in the direction of the arrow 1, Fig. 1; Fig. 5, an enlarged view of the rear portion of Fig. 1; Fig. 6, a transverse section on the line 3 4, looking in the direction of the arrow 2, Fig. 1; Fig. 7, a transverse section on the line 5 6, looking in the same direction; and Fig. 8, a section, drawn to an enlarged scale, on the line 7 8, Fig. 1, looking in the direction of the arrow 2.

B is the piston-rod, attached to or forming a part of the piston B', adapted to the cylinder A', and is caused to reciprocate therein by a valve, which may be similar to that described in the patent granted to me on the 24th day of March, A. D. 1874. At the outer end of the piston-rod B is the tool-holder c, which is made in two parts, or split throughout the greater portion of its length, the two sides being secured together at the front end by bolts, as shown in Fig. 2, so as to gripe the drill-rod, the tapering rear of the holder being embraced by a ring, $c^1$, the tightening of which on the tool-holder is insured by the striking of the drilling-tool against the rock. The ring $c^1$ has a flaring flange, $c^2$, which shields the stuffing-box of the cylinder from the detritus discharged from the hole in which the tool is operating. The piston-rod B passes through a sleeve, A, and has spiral grooves and ribs corresponding with those in the said sleeve.

The forward movement of the piston-rod will be in a direct course, the sleeve turning and accommodating itself to the said rod; but on moving back this rod must turn, owing to a clutch, the stationary portion $a'$ of which is secured within the cylinder A', the other portion, $a$, of the clutch turning with the sleeve, and being forced by a spring, $d$, against the portion $a'$, so that the inclined teeth of the face of the portion $a$ will slip over the teeth of the portion $a'$ when the piston-rod moves forward, but will engage with the teeth when the piston moves backward. The piston B' is chambered for the reception of the sleeve $b$, which has grooves $e$ adapted to projections $f$ on the piston, (see transverse section, Fig. 6,) these grooves being straight throughout the greater portion of their length, but curved or spiral near their inner terminations, as shown in Fig. 1.

Under ordinary circumstances during the reciprocating of the piston, the projections $f$ do not reach the spiral portions of the grooves, but should the drilling-tool meet with a crevice in the rock, and a longer forward movement of the piston than usual takes place, the said projections $f$ reaching the groove will turn the sleeve, and through the clutch $y$ will turn the nut W of the screw X, and will consequently feed the entire cylinder and its appliances forward, for the cylinder is adapted to ways in the frame Y, the latter being secured to the tripod in the manner described in Letters Patent allowed to me February 21, 1874.

The screw X is connected to the frame through the medium of an arm, $i$, and the sleeve $b$ is so confined to the cylinder that while it can turn freely it can have no longitudinal movement, the nut W being also confined in the head of the cylinder, as shown in Fig. 5, and so combined with a clutch, $y$, similar to the clutch $a$, above described, and acted on by a spring, that the sleeve can turn in one direction independently of the nut, but must be accompanied by the latter when turned in the opposite direction.

It will be observed, on reference to Fig. 1, that the teeth of the clutch $y$ are so arranged that the above-mentioned independent rotary movement of the sleeve $b$ in the direction of the arrow must take place during the rearward movement of the piston, and while the projections $f$ of the latter are traversing the grooves $e$, and that the turning of the nut through the medium of the sleeve and clutch, and consequent forward feed of the cylinder, must take place during that portion of the forward movement of the piston and drill-rod, when the projections $f f$ are traversing the spiral portions of the grooves.

Ordinarily the feeding is accomplished by turning the screw X, by means of a crank, with which it is provided at its outer end, in which case the projections $f$ of the piston are only permitted to traverse the straight portions of the grooves $e$, as before described.

If an automatic feed is desired, the screw X may be prevented from turning, by means of a jam-nut, $h$, but I prefer to substitute for the latter, a spring-pawl, $m$, attached to the arm $i$ and adapted to the teeth of a ratchet-wheel, $n$, on the screw-shaft, as shown in Figs. 1 and 8.

This pawl prevents any movement of the screw in the direction of the arrow which would interfere with the automatic feed, but does not prevent a reverse movement of the screw. When the screw has to be turned by hand in the direction of the arrow, Fig. 8, the pawl may be turned back from the teeth of the ratchet-wheel to the position indicated by dotted lines.

Openings $x x$, Fig. 4, should be made in the ratchet-clutch $a$, so that there may be no accumulation of water in the space beneath the clutch to neutralize the free action of the spring $d$.

It will be seen, on referring to Fig. 5, that a portion of the nut W is contained within a stuffing-box, $t$, by which such friction may be imparted to the nut as to prevent it from turning under the circumstances explained above.

The sleeve A is continued at considerable length to the stuffing-box $v$, so as to afford a long bearing for the piston-rod B, and so as to insure the lateral steadiment of the said rod when the blows are struck.

I claim as my invention—

1. The within-described drill-chuck $c$, consisting of two parts, or of one part, split throughout the greater portion of its length, and confined by bolts and by a ring, $c^1$, adapted to the tapering portion of the holder, all substantially as set forth.

2. The combination, substantially as described, of the grooved sleeve $b$, face-ratchet $y$, and nut W, with the piston B', and feed-screw X, of a rock-drilling machine.

3. The chambered piston B', having projections $f$, in combination with the sleeve $b$ having corresponding grooves $e$, made straight throughout the greater portion of their length and spiral at the end, all as and for the purpose set forth.

In testimony whereof I have signed my name to this specification in the presence of two subscribing witnesses.

JOHN B. WARING.

Witnesses:
GILBERT H. McKIBBIN,
L. W. COE.